United States Patent [19]
Holdway et al.

[11] 3,749,239
[45] July 31, 1973

[54] DOCUMENT TRANSPORT AND STACKING DEVICE AND SYSTEM

[75] Inventors: John B. Holdway, College Park, Md.; Robert M. Tyburski, Fairfax, Va.

[73] Assignee: Optical Recognition Systems, Inc., Reston, Va.

[22] Filed: May 25, 1972

[21] Appl. No.: 256,853

[52] U.S. Cl. .................... 209/74 R, 271/71, 271/82
[51] Int. Cl. .............................................. B07c 3/06
[58] Field of Search ......................... 209/74, 72, 73; 271/82, 71

[56] References Cited
UNITED STATES PATENTS
3,531,108  9/1970  Rabinow ...................... 209/74 R X
3,663,014  5/1972  Wasylenko ............................ 271/82

Primary Examiner—Richard A. Schacher
Attorney—Francis C. Browne, Joseph A. De Grandi et al.

[57] ABSTRACT

A transporting and stacking device for flexible sheet members such as documents in which a plurality of fingers are disposed for rotation about a cylindrical surface and are displaceable at a predetermined position in a flexible sheet transport path between a relatively open position for accepting the sheet members and a relatively closed position for gripping the members and transporting them about the cylindrical surface. The flexible sheet members are pulled around the cylindrical surface at their leading edges by the fingers and are released from the fingers by a stacking means located a predetermined distance around the cylindrical surface. A wait stop means is provided which causes each finger to wait out of the document transport path until a signal is provided which causes the finger to move to the predetermined position in the document transport path at which it accepts a document. A document reading and sorting system including a device for reading markings on documents and a plurality of transporting and stacking devices for sorting the documents in accordance with the markings read from the documents. The sorting system operates in an asynchronous mode in which a document sensing device located close to the transporting and stacking devices determines when the fingers arrive at the predetermined position in the document transport path.

21 Claims, 9 Drawing Figures

PATENTED JUL 31 1973 3,749,239

DOCUMENT TRANSPORT AND STACKING DEVICE AND SYSTEM

This invention relates to an improved transporting and stacking device and system for flexible sheet members such as documents.

The present invention provides a compact and extremely reliable document transporting and stacking device which is capable of handling flimsy and mutilated documents at relatively high speeds. Unlike many transporting devices of the prior art, the device of the present invention works on the principle of pulling documents by their leading edge instead of pushing them from behind and is thus able to move flimsy or mutilated documents which many devices of the prior art are unable to handle.

Additionally, the present invention incorporates a novel wait station for the document gripping means which grip and transport the documents which wait station enables the gripping means to wait for the arrival of the document to be transported at a position outside of the document transport path. This enables documents having holes in them to be transported without interference from the gripper means waiting for the next document and when a plurality of transporting devices are used in a document sorting system enables the gripper means of all devices except the device which is to transport the document, to be located outside of the document processing path.

It is therefore an object of the invention to provide a document transporting and stacking device which is effective to transport flimsy, mutilated or torn documents.

It is a further object of the invention to provide a document transporting and stacking device which pulls documents by their leading edge instead of pushing them from behind.

It is still a further object of the invention to provide a document transporting and stacking device which incorporates a wait station for the gripper means.

It is still a further object of the invention to provide a document reading and sorting system including transporting and stacking devices which incorporate wait stations for the document gripper means which cause the gripper means of each device except the device which is to transport the document to be located out of the document processing path.

The above objects are accomplished by providing a document transporting and stacking device including a plurality of fingers disposed for rotation about a cylindrical surface and being displaceable at a predetermined position in a document processing path between a relatively open position for accepting a document in the path and a relatively closed position for gripping the document and transporting it about the cylindrical surface. An abuttment means is provided adjacent the cylindrical surface and a predetermined distance around it for releasing the documents from the fingers. A wait stop means is provided a predetermined distance from the predetermined position at which documents are accepted by the fingers for enabling the fingers to wait out of the document processing path for the documents to arrive at the predetermined position in the path at which they are accepted. In a document reading and sorting system according to the invention utilizing a plurality of transporting and stacking devices a finger of each device except the device which accepts the document is positioned at the wait stop when the document passes that device while a finger of the device which accepts the document is positioned by means of another stop in the document transport path when the document is incident at that device.

The invention will be understood in greater detail by referring to the following Figures, showing a preferred embodiment of the invention, in which.

Figure 1:
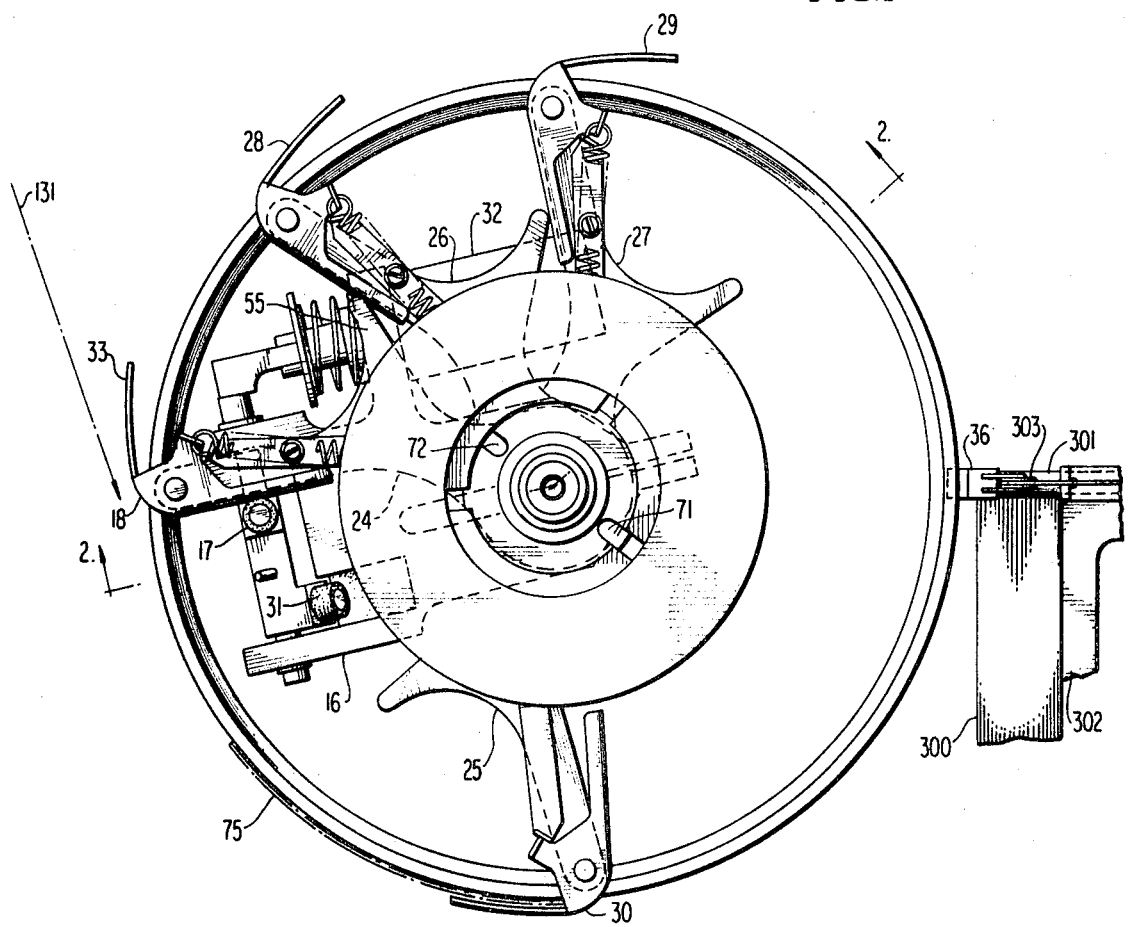
FIG. 1 shows a top view of the transporting device of the invention with the top of the device removed for ease of illustration wherein a gripper means is situated at the wait stop of the device.
Figure 2:
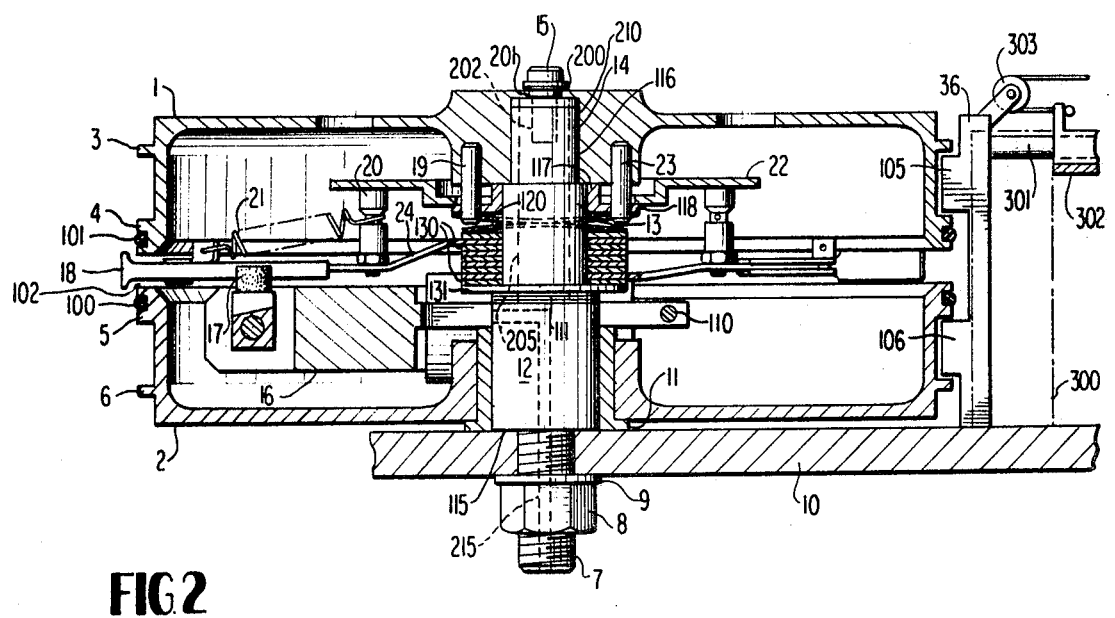
FIG. 2 shows a cross-sectional view of the transporting device according to the invention.
Figure 3:
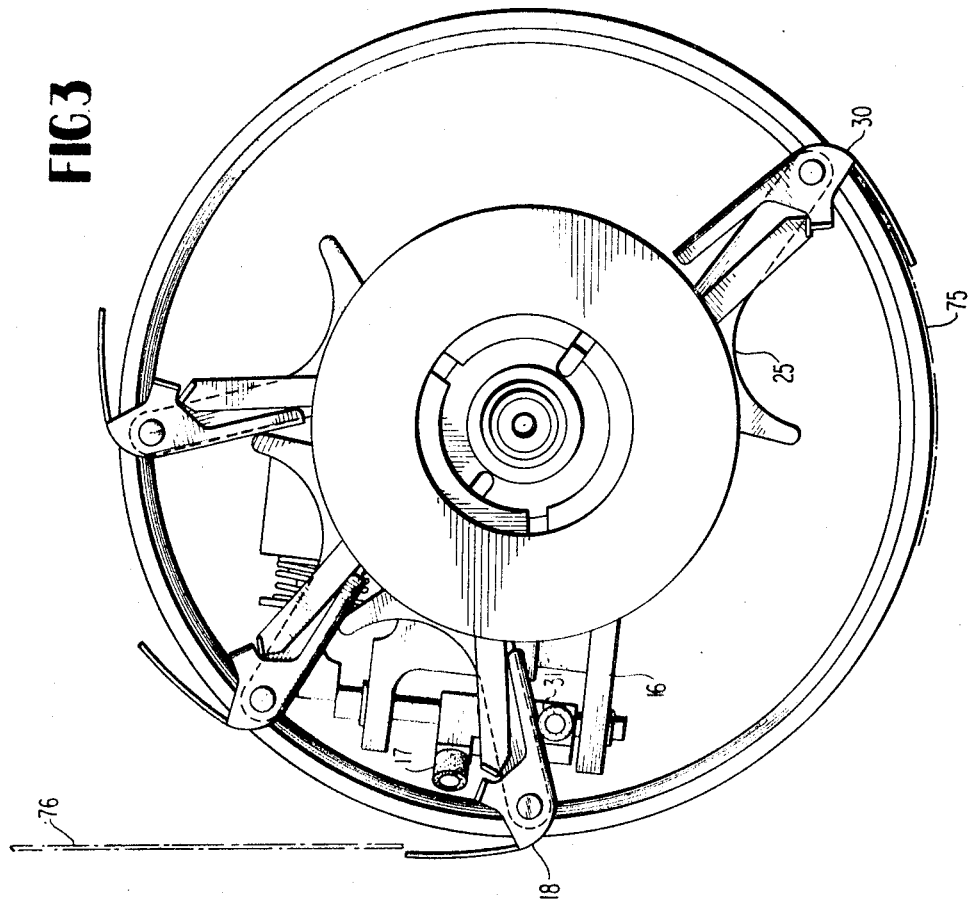
FIG. 3 shows a simplified top view of the device with the top removed for ease of illustration wherein a gripper means is located in the document processing path.

Referring to FIGS. 1, 2 and 3 a preferred embodiment of a document transporting and stacking device according to the invention is shown. The device is comprised of upper and lower drums 1 and 2 respectively, mounted with a space 102 therebetween in which gripper means 18, 28, 29 and 30 as shown in FIG. 1 rotate. As shown in FIG. 3, each gripper means opens to accommodate documents moving along a document processing path at stop 31 and closes on the document thereby gripping it against ledges 3, 4, 5, 6 and O-rings 101 and 102 of drums 1 and 2 when stop 31 is displaced out of the path of the gripper means. The document is transported by the gripper means around the surface of the drum to stacking member 36 where abuttments 105 and 106 block the movement of the document and cause it to be released from the finger which continues to rotate.

Referring to the structure in greater detail, it is seen that the device is comprised of four major components; upper and lower drums 1 and 2, post/stop means assembly 115/16 and spool/platform/arm assembly 116, 22, 24 to 27. Upper and lower drums 1 and 2 are cylindrical in shape and have ledge surfaces 3, 4 and 5, 6 respectively located about the outer periphery thereof. Additionally, upper drum 1 has O-ring 101 located between ledge 4 and the bottom of the drum while lower drum 2 has O-ring 100 positioned between ledge 5 and the top of drum. Both drums have holes in the centers thereof and may be constructed of any rigid metallic or plastic material.

The post 115 of the post/stop means assembly is comprised of three post portions of different diameters, lowest threaded portion 7, wider intermediate portion 12, and upper narrower portion 205 which has a threaded bore in the top thereof. Post 115 is locked into a predetermined fixed position on mounting table 10 by nut 8, washer 9, and bushing 11. Stop assembly 16 is locked to portion 12 of post 115 by set screw 110 and so also assumes a predetermined position with respect to mounting table 10.

Spool assembly 116 is comprised of top portion 14 and lower portion 13 both portions having a central hole of a constant diameter slightly greater than the diameter of post 205 therethrough. Topmost port 204 of portion 14 may be made of a different material than the remainder of portion 14. Post 205 is inserted in the central holes of spool assembly portions 13 and 14 and in the operation of the device the spool assembly rotates around stationary port 205. Upper drum 1 is secured to stationary post 205 by shoulder screw 15 and washer 200. The washer and screw are arranged so that when threaded screw portion 202 is screwed all the way into the threaded bore so that it can't be turned any further because of shoulder 201, drum 1 has a very slight amount of play in the vertical direction.

Lower spool portion 13 has a platform 22 fastened thereto which has an inner radial portion 117 which is secured to the outer portion of the platform at 118. Portion 117 has at least two holes 71 and 72 therein shown in FIG. 1 in which are inserted posts 19 and 23 of upper drum 1. Hence, when upper drum 1 rotates motion will be imparted to platform 22 and spool portions 13 and 14.

Figure 8:
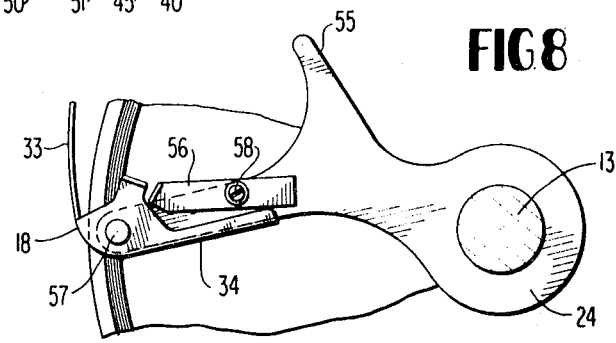
FIGS. 8 and 9 are detailed top views of the gripper of the invention.
Figure 9:
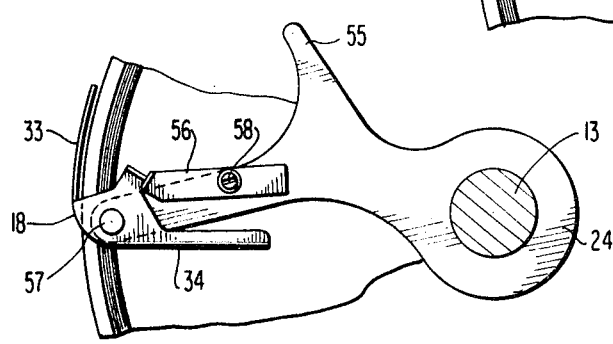

Arms 24 to 27 are secured to lower spool portion 13 in a friction clutch arrangement. Thus double-D washers 130 are fastened securely to spool portion 13 so that they rotate with it. Between washers 130, as may be seen in FIGS. 2, 8 and 9, are disposed the looped end portions of arms 24 to 27. Spring washer assembly 120 located between the top double D washer and platform portion 117 provides the necessary compression force to the washers and arm loop portion so that the clutch is engaged when spool portion 13 rotates and arms 24 to 27 rotate with it. When one of the arms, however, is stopped from rotating, for instance, by either of stops 17 or 31, then the clutch slips and spool portions 13 and 14 as well as the remainder of the arms continue to rotate.

Bottommost washer 131 of the friction clutch assembly rests on shim 111 which is located between shaft portion 12 and washer 131 and each arm is shaped so that although the looped portions of the arms are at different levels at spool portion 13 the other ends of the arms to which the gripping fingers are secured are at the same level at space 102 between the upper and lower drums.

As may be seen most clearly in FIGS. 1, 8 and 9 at the outer end of each arm is located gripping finger which is used to grip a document against the outside surfaces of the drum and transport it therearound. These fingers shown at 18 and 28 to 30 in FIG. 1 may be unitary members and are selectively opened and closed to respectively receive and grip the documents by the operation of stop assembly 16 shown in detail in FIGS. 1, 5, 6, and 7. It is seen that finger 18 which is identical to the other fingers is comprised of flexible gripper portion 33, and rigid displacer portion 34. The finger is pivoted at pivot 57 near the juncture of portions 33 and 34 and may assume an open position as shown in FIG. 8 or a closed position as shown in FIG. 9, which position in an actual embodiment may be slightly inside the O-rings of the drums. The fingers are spring-biased to the closed position by coil compression spring 21 shown in FIG. 2 and connected between a portion of the finger and post 20 which extends from the arm 24 almost to the level of platform 22, there being a slight clearance between the post and the platform. As shown in FIG. 9, the closed position of the finger is determined by stop 56 which is attached to arm 24 by screw 58 and which is abutted by finger 18 in the closed position. Finger 18 will pivot to its open position around pivot 57 when displacer portion 34 is forced against one of the stops 17 or 31 of stop assembly 16, and will pivot to its closed position when the stop against which it is forced is displaced out of the finger path. A piece of cork is glued to the inside of each finger to reduce shock and noise and the fingers have a chrome surface to reduce the friction to allow the finger to release the document during the stacking operation.

In the ordinary operation of the device as shown in FIG. 3, a document 76 will be traveling along a predetermined document processing path. The position of stop 31 is fixed with respect to the document processing path by means of the rigid attachment of stop means assembly 16 to post portion 12 and the rigid attachment of post portion 12 to mounting table 10. As may be seen in FIG. 5 stops 31 and 17 are displaceable by activation of a solenoid 32 between two predetermined pssitions. In the position shown in FIG. 3, stop 31 is oriented vertically and stop 17 is located at an angle to the vertical while in the position shown in FIGS. 1 and 5 stop 17 is oriented vertically while stop 31 is at an angle to the vertical. As mentioned above, stop 31 is positioned with respect to the document transport path so that when it is in the vertical position and a finger pushes up against it, the finger will open so as to accommodate a document in the document transport path. For reasons to be described later, stop 17 is positioned so that when it is in the vertical position as shown in FIG. 1, a finger opening against it will be outside of the document transport path, the transport path being represented by arrow 131 in FIG. 1.

Figure 5:
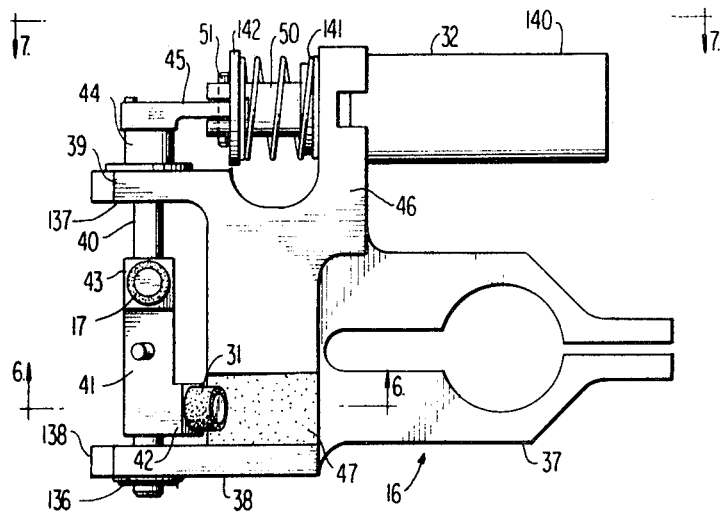
FIG. 5 shows a detailed top view of the displaceable stop means assembly of the invention.
Figure 6:
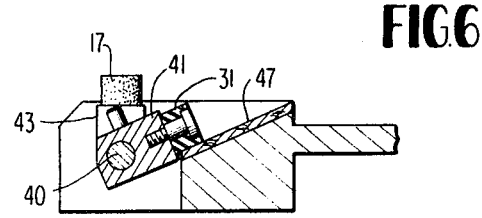
FIG. 6 is a detailed sectional view of the stop means assembly taken at plane 4—4 of FIG. 5.
Figure 7:
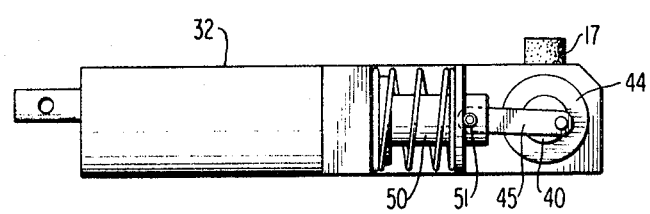
FIG. 7 shows a detailed side view of the solenoid sub-assembly of the stop means assembly.

Stop assembly 16 shown in detail in FIGS. 5, 6 and 7 is comprised of mounting portion 37, stop block support section 38, stop block support 41 and solenoid portion 32. Mounting portion 37 has a central hole as shown in FIG. 5 and post 12 as shown in FIG. 2 is inserted therein and secured by set screw 110. Stop block support section 38 has arms 39 and 138 having holes 137 and 136 respectively therein. Shaft 40 having stop block support 41 located thereon is mounted at either end in holes 137 and 136 for pivoting movement. Stop block support 41 has raised surfaces 43 and 42 thereon and located at an angle to each other as shown in FIG. 5. Support 38 has angular rest portion 47 molded therein which lies at an angle to the plane of surface 46 and which may be covered with a replaceable absorbent layer such as cork. Stops 31 and 17 are located respectively on raised surfaces 42 and 43 and are cylindrical in shape. The stops may comprise an inner metallic core surrounded by an outer layer of somewhat softer material.

Solenoid assembly 32 comprises solenoid activation means 140 connected to movable member 50 with coil compression spring 141 being located between abuttment 142 and activation means 140. Member 50 has spindle 51 located through parallel holes in the forked ends thereof and motion transmitting member 45 is connected at one end of the spindle and at the other end as can be seen in FIG. 7 it is eccentrically mounted to shaft 44. When solenoid activation means 140 is activated by an electrical pulse, members 50 and 45 are pulled inwardly toward the electrical activation means and member 45 turns shafts 44 and 40 so that stop 31 assumes a vertical position while stop 17 moves to the left in FIG. 5 away from the vertical position. Solenoid assembly 32 may be designed so that activation member 50 immediately starts to return to its outward position after being pulled in, in which case stop 31 will immediately start to move towards rest 47 after being activated to the vertical position, or in the alternative solenoid assembly 32 may require a second electrical pulse to move activation member 50 outward and return stop 31 to the rest position.

The operation of a document transport and stacking device according to the invention will now be described. Drums 1 and 2 are driven by belts (not shown) at the same speed which is optimally predetermined for each document processing application. Referring to FIG. 2 rotation of upper drum 1 causes posts 19 and 23 to rotate platform 22 which in turn rotates spool portions 13 and 14 around post 205. Arms 24 to 27 which are secured to spool portion 13 in friction clutching arrangement as hereinbefore described rotate with portion 13. In the position shown in FIG. 1, arm 24 is waiting at wait stop 17 with finger 18 being opened by the force of displacer portion 34 against wait stop 17. As can be seen, flexible gripper portion 33 is not opened in the document transport path 131. Finger 30 which has already picked up a document is ahead of finger 18 and is in the process of transporting document 75 around the drum. The friction clutch assembly is designed so that it will slip when an arm is prevented from rotating by one of the stops and arm 25 and finger 18 can thus continue rotating with drum 1 even though arm 24 is prevented from moving by stop 17. Hence, after a finger grips a document its motion continues uninterruptedly until the document is released from the finger abuttments 105 and 106 of stacking assembly 36.

Figure 4:
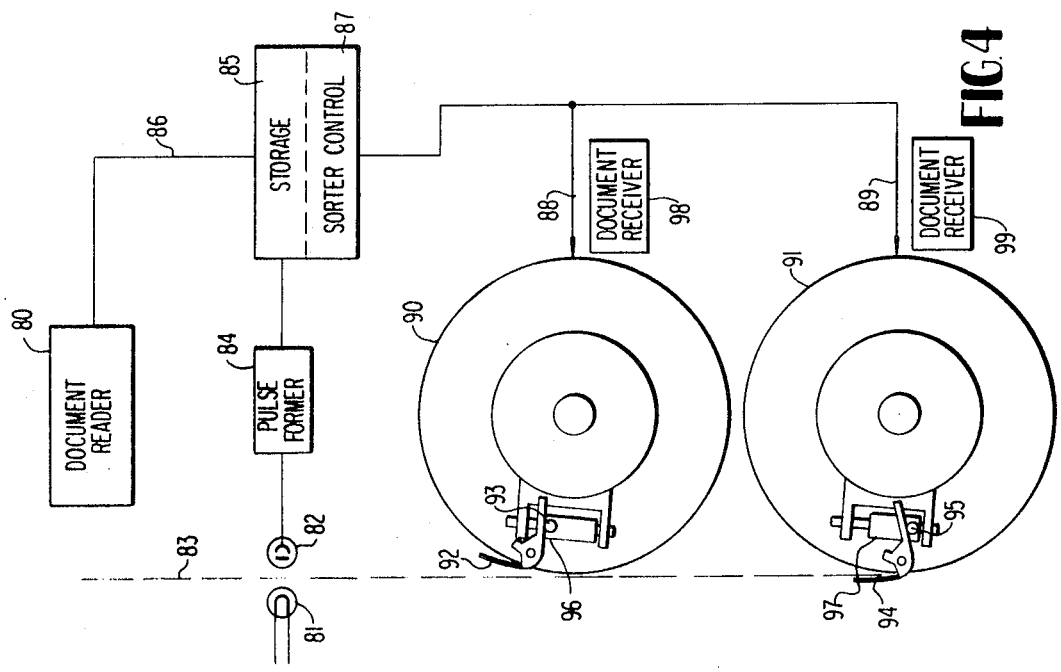
FIG. 4 shows a document reading and sorting system including a plurality of the transporting devices shown in FIG. 1.

At a predetermined distance away from the device along the document transport path 131 a document-sensing device is disposed. This device may for instance be the combination of a light source 81 and photocell 82 as is shown in FIG. 4 wherein the photocell is operative to emit a pulse the instant that a document passes it. Because the speed of travel of the document is known as well as the distance between the document sensing sevice and the document transport and stacking device, the pulse is stored for a predetermined time and is arranged to activate solenoid assembly 32 so that stop 17 moves to the left and stop 31 moves into the vertical position slightly before the time that the document arrives at the position shown in FIG. 3. If the solenoid used is the type which automatically returns to its initial position, then the pulse supplied to the solenoid should be arranged to move finger 18 into abutment with stop 31 just slightly before the document arrives at the position at which it is gripped because in this case the finger will begin to close immediately after it is opened. On the other hand, if the solenoid used is the type which requires a separate pulse to move the solenoid activation member in each direction, then the pulse which results in the movement of stop 31 to the vertical direction can occur somewhat before the document arrives at the position at which it is gripped and finger 18 can wait for the document for a short period of time. Then, a second pulse would be emitted a predetermined time after the first pulse and would be timed so that stop 31 moves to the right and finger 18 closes at the time at which the document arrives at the position at which it is gripped. Hence in accordance with the rate that documents are detected by detection means 81, 82 fingers are successively moved to stop 31 to open in the path of the oncoming document, to close on the document thereby gripping it and to transporting it around the drum. Due to the friction clutch once a document is gripped by a finger it is uninterruptedly transported to stacking assembly 36 notwithstanding the fact that the movement of other arms may be prevented by stop 17 or 31. As may be seen in FIGS. 1 and 3 during the operation of the device, some of the arms may congregate behind an arm which is at stop 17. Each of these stopped arms, behind the arm at the stop assembly, is stopped by a projection on the arm ahead of it such as projection 55 on arm 24.

One advantage of using wait stop 17 in addition to stop 31 is that it eliminates problems encountered in transporting documents having holes in them, especially when the documents are relatively long. As may be seen in FIG. 1, if stop 17 were not present, finger 18 would be waiting for the next document at the position of stop 31. If document 75 being carried by finger 30 were slightly longer and had a hole in it at the position at which flexible gripper portion 33 opened into, then portion 33 would catch the document in the hole and prevent it from being properly transported around the drum by finger 30. The addition of stop 17 thus insures that finger 18 and flexible gripper portion 33 wait for the next document out of the range of the preceding document being transported around the drum.

Each document is gripped by a finger so that it rides against ledges 3, 4, 5 and 6 and O-rings 100 and 101 around the periphery of the drum. When the document arrives at the position of member 36, it encounters abuttments 105 and 106 which detach the document from the finger. Additionally, means for ensuring that the documents are stacked in a vertical position may comprise part of the stacking assembly and such means is shown in part in FIGS. 1 and 2 wherein member 300 against which the documents are vertically stacked is secured to member 302 which is mounted for horizontal movement on shaft 301 which is attached to member 36. Members 302 and 300 are biased in the direction of the transporting device by conventional mechanical means such as pulley and cord 303 so that before any documents have been stacked member 300 is close to the transporting device. The documents are then released from the fingers by abuttments 105 and 106 and fall against member 30 in the vertical position. Member 300 may have a flat strip attached to the bottom thereof (not shown) which rests on table 10 on which the ends of the document lie. As documents become stacked against member 300, member 300 and 302 may move backwards on shaft 301 to accommodate more documents.

FIG. 4 shows a document reading and sorting system according to the invention which is operative to sort documents in accordance with markings read from the documents. While only two transporting and stacking devices 90,91 are shown in FIG. 4 it is to be understood that any number of such devices could be used. Additionally, the system may be used to either sort documents in accordance with markings which are positively read from the documents, or to sort documents in accordance with whether the reading device is or is not able to positively read the documents. For instance, in FIG. 4 documents with markings denoted as A may be sorted by device 90 while those with markings denoted as B may be sorted by device 91 or in the alternative documents on which markings are positively identified may be sorted by device 90 while those which can't be read by the reader may be sorted by 91. In this case device 90 would be an accept transporter while device 91 would be a reject transporter. Document receivers 98 and 99 may take the form of unit 36 of FIG. 2.

The documents are transported by any type of document transport means along processing path 83 and document reader 80 is operative to read the markings on the document. Such markings may be in the form of a code such as dots or bars or multi-colored markings, or may be conventional or unconventional characters, and document reader 80 is a device as is known to those skilled in the art for reading such markings and for emitting electrical signals on line 86 corresponding to the markings read. The electrical signals are stored in electrical storage unit 85 and the pulse output of pulse former 84 is operative to read out the information stored in storage unit 85 to sorter control unit 87. Sorter control unit 87 is a unit the design of which is within the knowledge of one skilled in the art, which is operative to send an activation pulse to a selected one of the devices 90, 91 along lines 88, 89 in accordance with the particular signal received from unit 85 indicative of the particular markings read from the document.

The time that the activation pulse is inputted to the selected transporting device is determined by sorter control 87 on the basis of the time of occurrence of the output pulse from unit 84, the speed that the document is travelling, and the predetermined distances between sensing device 81, 82 and each of the transporting and stacking devices.

In the situation shown in FIG. 4, it is device 91 which is activated and finger 94 is opened by stop 95 in the document processing path. It is to be noted that wait stop 93 on device 90 is located so that finger 92 is positioned outside of the document processing path so that documents passing by device 90 are not interfered with by finger 92. If the wait stop were not present, it would be necessary to activate the solenoid of device 90 just before the document passed device 90 to ensure that no finger would be present in the processing path to interfere with the movement of the document. Hence the use of wait stop 93 results in less frequent activation of the solenoids of the transporting and stacking devices of the invention.

It should be noted that the system of FIG. 4 as well as the device of FIGS. 1 and 2 is operated in the asynchronous mode in which the fingers do not arrive at the predetermined position in the document transport path in synchronism with the document input device and the system of the present invention is therefore not subject to the same limitations as synchronous systems. Rather in the present system the document sensing device 81, 82 is located only a short distance from the finger of the transporting and stacking devices with the position of the fingers being controlled by the sensing device.

While I have described and illustrated a preferred embodiment of my invention, I wish it to be understood that I do not intend to be restricted solely thereto, but that I do intend to cover all modifications thereof which would be apparent to one skilled in the art and which come within the spirit and scope of my invention.

What is claimed is:

1. A device for transporting flexible sheet members comprising: a cylindrical member having an outside cylindrical surface, a plurality of fingers disposed for rotation about said outside cylindrical surface and being displaceable between a relatively open position for accepting said flexible sheet members and a relatively closed position for gripping said flexible sheet members against said outside cylindrical surface, means for rotating said fingers about said outside cylindrical surface, means at a predetermined location for displacing said fingers between said relatively open position and said relatively closed position, and wait station means located a predetermined distance from said means for displacing for stopping the rotation of said fingers before they arrive at said predetermined location.

2. The device of claim 1 wherein said means for displacing said fingers between said relatively open and said relatively closed positions comprises stop means displaceable between a first position in which the rotation of said fingers about said outside cylindrical surface is blocked and a second position in which the rotation of said fingers is not blocked, said fingers being arranged to move to said open position when their movement is blocked and to move to said closed position when their movement is not blocked.

3. The device of claim 2 wherein said wait station means comprises second stop means which is displaceable between a first position in which the rotation of said fingers about said surface is blocked and a second position in which the rotation of said fingers is not blocked.

4. The device of claim 3 wherein said stop means and said second stop means are arranged so that when said stop means is in said first position said second stop means is in said second position and when said stop means is in said second position said second stop means is in said first position.

5. The device of claim 4 further including common means for moving said stop means and said second stop means between said first and second positions.

6. The device of claim 5 wherein said stop means and said second stop means comprise projections disposed on different faces of the same member, said common means for moving being connected to said member.

7. The device of claim 6 wherein said common member includes a shaft having a motion transmitting member connected eccentrically thereto, and wherein said means for moving includes said motion transmitting member and a motion producing member.

8. The device of claim 7 wherein said motion producing member is a solenoid.

9. The device of claim 7 wherein said shaft is mounted for limited rotation in a housing which includes a limit means for abutting one of said projections when said first or second stop means is in one of said first or second positions.

10. The device of claim 2 wherein said fingers comprise a relatively flexible gripper portion and a displacer portion, said fingers being pivoted for opening and closing about a pivot point located between said gripper portion and said displacer portion, said fingers being biased to said closed position and being displaceable to said open position about said pivot point by the force of said stop means against said displacer portion when the movement of said displacer portion about said cylindrical member is blocked by said stop means.

11. The device of claim 10 wherein each of said plurality of fingers is located at one end of an arm and wherein each finger is biased to said closed position by a biasing means located between the finger and a projection located on the arm on which the finger is located.

12. The device of claim 11 wherein the other ends of all of said arms are disposed about a shaft at different levels thereof, said arms being shaped so that all of said arms are at the same level at said one ends thereof.

13. The device of claim 1 wherein said means for rotating said fingers includes means for allowing at least one finger to continue rotating when the rotation of another of said plurality of fingers is blocked.

14. The device of claim 13 wherein said means for allowing comprises friction clutch means.

15. The device of claim 14 wherein each of said fingers is located at one end of each of a plurality of arms wherein the other end of said arms are located at said friction clutch means.

16. The device of claim 15 wherein said friction clutch means is disposed at the center of said cylindrical member.

17. The device of claim 1 wherein said cylindrical member is rotatable and wherein said means for rotating said fingers includes said cylindrical member.

18. The device of claim 17 in combination with abuttment means located adjacent said cylindrical surface in the path of said fingers for removing said sheet members from said fingers.

19. A device for transporting flexible sheet members out of a predetermined path in which they are moving comprising; a cylindrical member having an outside cylindrical surface, a plurality of fingers disposed for rotation about said outside cylindrical surface and being displaceable between a relatively open position for accepting said flexible sheet members and a relatively closed position for gripping said flexible sheet members against said outside cylindrical surface, means for rotating said fingers about said cylindrical surface, means for displacing said fingers at a predetermined location in said document transport path between said relatively open position and said relatively closed position, and stop means for said fingers located a predetermined distance from said means for displacing for stopping said fingers out of said transport path before said fingers arrive at said means for displacing.

20. A system for sorting documents in accordance with markings on said documents comprising:
means for reading said markings on said documents,
means for conveying said documents along a document transport path to a plurality of sorting means adjacent said document transport path, each of said sorting means including at least one gripper means for gripping one of said documents in said document transport path when activated and transporting it out of said document transport path, each of said sorting means further including first and second rest means for said gripper means, said gripper means being out of said document transport path when it is at said first rest means and being in said document transport path when it is at second rest means,
means responsive to said means for reading for causing a gripper means at one of said sorter means selected in accordance with said markings read to be at said second rest means when a document arrives at said selected sorting means and for causing a gripper means at said other of said plurality of said sorting means to be at said first rest means when said document passes said other sorting means, whereby when said gripper means of said selected sorting means is activated when a document arrives at said selected sorting means, said document will be transported by it out of said document transport path.

21. The system of claim 20 wherein said gripper means comprises a finger which is open in said document transport path when it is at said second rest means and which is closed when activated.

* * * * *